REFLECTION SHOOTING PROCEDURE FOR THE ACCURATE DETERMINATION OF DIP

Original Filed June 29, 1935 2 Sheets-Sheet 1

Ludwig W. Blau Inventor

By W. F. Weigester Attorney

REFLECTION SHOOTING PROCEDURE FOR THE ACCURATE DETERMINATION OF DIP

Original Filed June 29, 1935 2 Sheets-Sheet 2

Ludwig W. Blau Inventor

By W.E. Weigester Attorney

Reissued Aug. 29, 1939

Re. 21,183

UNITED STATES PATENT OFFICE 21,183

REFLECTION SHOOTING PROCEDURE FOR THE ACCURATE DETERMINATION OF DIP

Ludwig W. Blau, Houston, Tex., assignor to Standard Oil Development Company, a corporation of Delaware Original No. 2,058,764, dated October 27, 1936, Serial No. 29,183, June 29, 1935. Application for reissue October 18, 1938, Serial No. 235,639

23 Claims. (Cl. 181—0.5)

This invention relates to improvements in seismic prospecting. It is customary in reflection shooting at the present time to explode charges of dynamite at a certain location and to place detectors on a line through the shotpoint at different distances. From the same shotpoint records are obtained in from one to four directions. This method suffers from the serious disadvantage that the low velocity layer, usually the surface layer, varies in thickness, in elastic properties and in density from one instrument location to the next to such a degree that results are often vitiated. Past experience has proved that it is often impossible and nearly always impractical and uneconomical to determine these variations in the low velocity layer. It has been therefore impossible or too expensive to obtain accurate measurements of the dip of the strata in those areas where the low velocity layer is variable.

It is an object of this invention to provide for cancelling the effect of the low velocity surface layer, so as to obtain accurate measurements of the dip of the sub-surface strata.

Other objects will be apparent from the specification and from the accompanying drawings in which latter:

Figure 1:
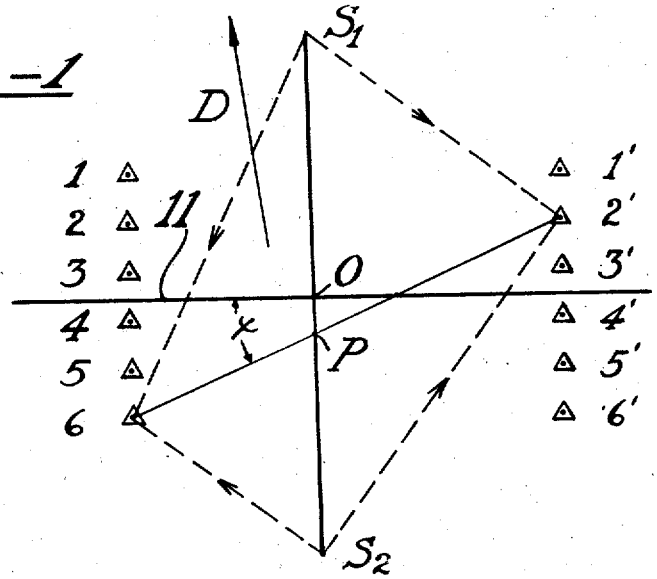
Fig. 1 is a diagrammatic representation of a preferred form of shooting arrangement.

Referring particularly to Fig. 1 of the drawings, an arrangement of seismographs with respect to the shot-points is illustrated which is very sensitive to dip. The letters $S_1$ and $S_2$ designate spaced shotpoints. The distance between the shotpoints should be as great as conditions permit, for example, two miles or more. Reference numerals 1 to 6 and 1′ to 6′ designate pickup locations on a line parallel to line $S_1OS_2$ which directly connects the shotpoints. Preferably the pickup locations are one-half mile or more distant from the line $S_1OS_2$. Adjoining pickups are preferably about 150 feet from each other. The point O is a point taken one-half way between the shotpoints $S_1$ and $S_2$.

With pickups on locations 1 to 6 inclusive, records are obtained by shooting or otherwise creating seismic disturbances at the shotpoint S′. Then, without disturbing any of the pickups or their amplifiers, records are secured by creating a seismic disturbance at shotpoint $S_2$. The shooter remains at shotpoint $S_2$ while the pickups are moved to locations 1′ to 6′ inclusive. Seismic disturbances from shotpoint $S_2$ are recorded at the locations 1′ to 6′. The shooter then returns to shotpoint $S_1$ and the final records are obtained from this shotpoint at the locations 1′ to 6′ without disturbing the pickups or their amplifiers.

Close examination of the records is now made with an object to find the two pickup locations, one on each pickup line 1 to 6 and 1′ to 6′, at which reflections from the subterranean layer under investigation arrive at the same time from both shotpoints $S_1$ and $S_2$. In Fig. 1 these locations are those designated 6 and 2′.

To make this quite clear, assume that the reflection arrived at location 2′ in 1.785 seconds from both shotpoints $S_1$ and $S_2$. Then the requirement is that the same reflections arrive at pickup 6 in the same time from both shotpoints $S_1$ and $S_2$, but not necessarily in 1.785 seconds. The time for the reflection to arrive at pickup 6 may be shorter or longer than the time for the reflection to arrive at pickup 2′. It may happen that one can interpolate to a point between two pickups. A line is drawn connecting these two points. It is easy to see that if the line $S_1OS_2$ lies along the dip of the reflecting earth layer, the line through equal time pickup locations will be parallel to the perpendicular, designated II, to $S_1OS_2$ through O. Furthermore, the line through equal time pickup locations will intersect line $S_1OS_2$ in a point P which lies up-dip from O. It is advisable therefore to place the shotpoints $S_1$ and $S_2$ in alignment in the direction of the dip.

It is not necessary, however, to know the direction of the dip of the subsurface stratum. One can usually guess as closely as the method requires. In Fig. 1 the dip is in the direction of the arrow D.

The mathematical development is too long to be reproduced here. Only the results will be given.

If H is the perpendicular distance to the reflecting layer, $\theta$ the angle of dip, $\varphi$ the angle between the strike of the reflecting layer and the line $S_1OS_2$ and OP and $\psi$ as shown in the figure, then $$\sin\ \theta=\left(\frac{H}{OP}\right)\sqrt{ctn.2\psi+\tfrac{1}{2}\left[1+\left(\frac{OP}{H}\right)^2-\sqrt{1+2\left(\frac{OP}{H}\right)^2}\right]}$$

$$ctn.\phi=\tfrac{1}{2}\tan\psi\left[\sqrt{1+2\left(\frac{OP}{H}\right)^2}-1\right]$$

It is significant that this method guarantees a minimization of errors. Thus, the pickups are not moved for the shots from the two shotpoints $S_1$ and $S_2$; as stated above, we have the same low velocity correction for both sets of records. Likewise, if the shotpoint times are different, we nevertheless have the same time for both pickup set-ups. A radical difference in shotpoint times has only the one effect, that the 6—2′ will be shifted parallel to the true line. Thus the dip and strike are given correctly in magnitude, but in the case of a small dip of the subsurface strata line 6—2′ may be shifted from one side of O to the other, thus giving the dip in the wrong direction. A radical difference in low velocity corrections from one set-up to the other has no effect on the position of the line 6—2′ at all, if the corrections are substantially the same along each set up.

Figure 2:
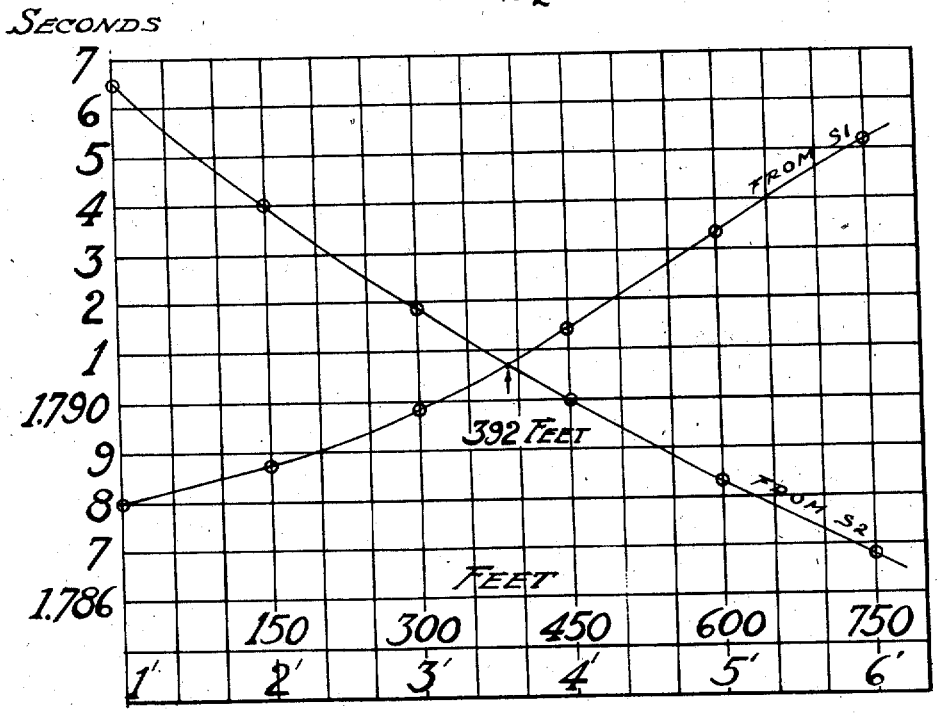
Fig. 2 illustrates the computation scheme for use with the arrangement illustrated in Fig. 1.

A preferred method for determining the point to where the reflection times from both shotpoints $S_1$ $S_2$ are equal is the following:

The reflection times for all pick-ups are plotted on graph paper to scale. The point of intersection of the smooth curves drawn through the reflection times defines the point on the pickup lines at which the reflection times from both shotpoints are equal, as is illustrated in Fig. 2. It is evident also from Fig. 2 that moving the two curves up or down, both through the same vertical distance does not change the value "392 feet". Low velocity corrections which are the same for all pickups on the line cause such a shifting of the two smooth curves.

This method, as has been shown above, is remarkably free from the disadvantages which vitiate results when other methods are employed, because shotpoint corrections and low velocity layer corrections do not affect the strike, and only rarely the dip value obtained.

Figure 3:
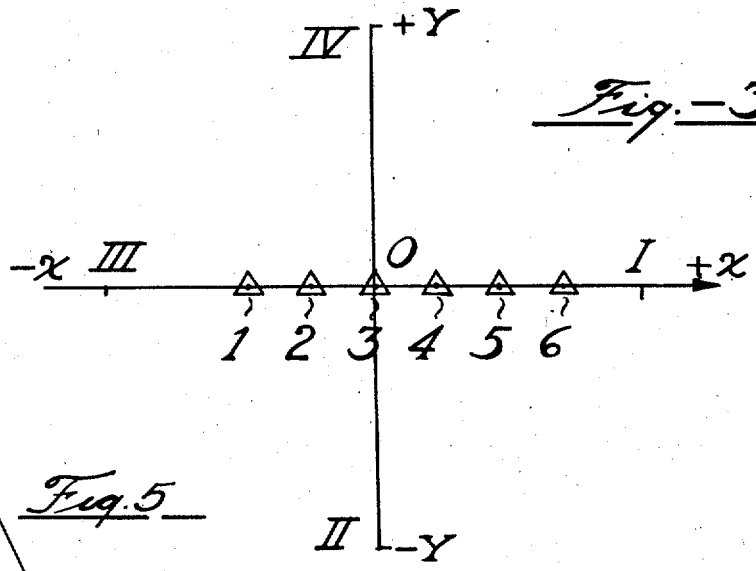
Fig. 3 is a diagrammatic representation of a modified form of shooting arrangement.
Figure 5:
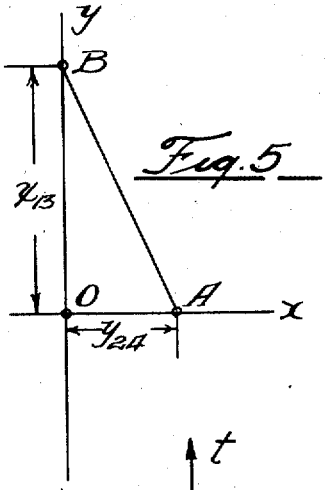
Fig. 5 is a diagrammatic representation of the computation of the dip.

Referring particularly to Fig. 3, an alternative arrangement for carrying out the invention is illustrated in which two perpendicular directions are chosen, one of which, if possible, should be nearly along the dip of the subsurface strata. We will call one of these directions the $x$ direction and choose a positive direction on it. The other direction we will call the $y$ direction and choose a positive direction on it to match the Fig. 3. The intersection of these two lines we will call O. In each of the four directions on the lines measure a fixed distance, the same for each, from O. These will be the four shotpoints and will be numbered I, II, III and IV, to match Fig. 3.

Pickups 1—6 inclusive are strung along the $x$ direction from III to I, one pickup, designated 3, being at O, three pickups 4, 5 and 6 being disposed on the side which is believed to be down dip and two pickups, designated 1 and 2, are disposed on the other side. Without moving the pickups shots are fired at each of the points I, II, III and IV. The pickups, except No. 3, which is at O, are now moved to the $y$ direction, three being again placed on the side which is believed to be the down-dip and two on the other. With the pickups in the new positions, shots are again fired from each of the four points, I, II, III and IV.

It is not necessary that the pickups be located on the lines connecting the particular shotpoints shown in Fig. 3. They can be placed along any other two lines, preferably perpendicular to each other, the lines extending through the point O. In practice, the arrangement shown in Fig. 3 is generally more convenient to use because much of the work is done along roads and public highways. The point O then marks the intersection of two highways.

The distances between shotpoints should be as great as experience in the region shows to be consistently permissible. The holes in which the seismic disturbances are created should be as deep as possible and have their bottoms at as near the same level as possible.

Figure 4:
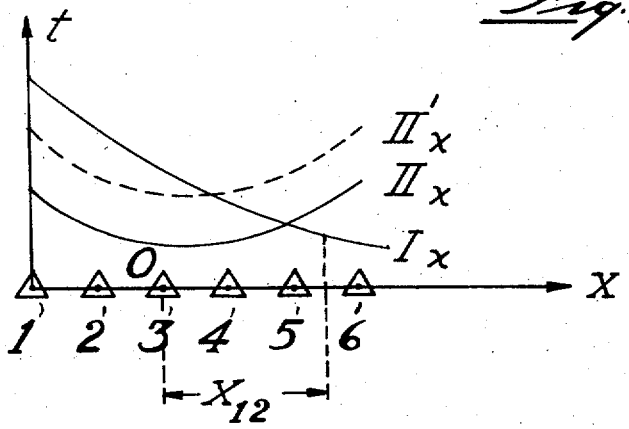
Fig. 4 illustrates the computation scheme for use with the shooting arrangement illustrated in Fig. 3.

The results are calculated as follows: From the records as obtained above time distance curves are plotted for the reflection under consideration. The curve for the shot from point I with the pickups along the $x$ direction we will call $I_x$; on the same manner we name the other curves $I_y$, $II_x$, $III_x$, $III_y$, $IV_x$, $IV_y$. From the intersection of the curves $I_x$ and $II_x$, a point on the $x$ line is determined for which the time from the two shotpoints is the same as clearly shown in Fig. 4.

The distance of this point from O we will call $x_{12}$ and if the point is on the same side of O as I, we will call it positive. Similarly from the curves $III_x$ and $IV_x$ we determine the distance $x_{34}$. Calculation shows that if there were no correction due to the low velocity layer at the shotpoints, the distance $x_{12}$ and $x_{34}$ would be equal. In the same way, we determine distances $y_{12}$ and $y_{24}$ which should be equal. Likewise we can determine distances $x_{14}$ and $x_{23}$ which should be equal and $y_{14}$ and $y_{23}$ which should be equal.

We should have the four equations:

(1) $x_{12} = x_{34}$, $y_{12} = y_{34}$, $x_{14} = x_{23}$, $y_{14} = y_{23}$ satisfied.

If the low velocity layer is different at the four shotpoints, the times from the different shotpoints will be increased by different amounts and the distances which should be equal in pairs will not be equal.

Suppose that the Equations 1 are satisfied, or nearly so. Using the curves $I_x$ and $III_x$ we determine $x_{13}$, choosing the sign as before—that is positive if the point of intersection is on the same side of O as I. Similarly from the curves $II_y$ and $IV_y$ we determine $y_{24}$—calling it poitive if the point of intersection is on the same side of O as IV.

By the use of the distances $x_{13}$ and $y_{24}$ and H, the depth of the reflecting plane which is determined in the usual manner, we can get the magnitude and direction of the dip. Let $\varphi$ be the angle the reflecting plane makes with the horizontal. Then:

$$\sin\ \phi=\frac{\sqrt{x_{13}^2\pm y_{24}^2}}{2H} \qquad (2)$$

If along the $x$ direction we measure a distance $y_{24}$, determining a point A, and along the $y$ direction a distance $x_{13}$, determining a point B, the line AB is parallel to the strike and the point O is up the dip from the line AB. (Note that $x_{13}$ is measured along the $y$ direction and $y_{24}$ along the $x$ direction to determine the line AB.)

The error in the distance $x_{13}$ and $y_{24}$ is of the same order as the amount by which the pairs of points, which should coincide, fail to do so. This gives us an idea of the largest and smallest possible values of $x_{13}$ and $y_{24}$ and so of the limiting values of the angle and direction of dip.

Another method of getting an estimate of the error in our determination of dip is as follows: The low velocity layer at any shotpoint increases the travel-time of all pickups by the same amount. This means that if we subtract the time spent in the low velocity layer, we get a time-distance curve by shifting the observed curve vertically, as shown by the dotted curve $II'_x$ in Fig. 4. The curves $II_x$ and $II_y$ give times from the same shotpoint and so must be shifted vertically by the same amount. Likewise $III_x$ and $III_y$ are shifted by the same amount, which in general is not equal to the amount by which $II_x$ and $II_y$ are shifted. Similarly for $I_x$ and $I_y$ and for $IV_x$ and $IV_y$. The problem of correction is to shift the curves so that the Equations 1 are satisfied by the distances determined from the corrected curves. When these equations are satisfied, we determine $x_{13}$ and $y_{24}$ from the corrected curves and use them as before. In general, the two values lie between these and the uncorrected values.

It will be seen that the dip of a given subsurface stratum is determined by successively created seismic waves at a plurality of spaced shotpoints and in turn simultaneously receiving the waves from each shotpoint at a plurality of receivers disposed on straight lines between the shotpoints. When operating according to the procedure illustrated in Fig. 1, the dip of a given subsurface stratum is determined by successively creating seismic waves at a plurality of aligned shotpoints, and in turn simultaneously receiving the seismic waves of each shotpoint at a plurality of receivers disposed on a line substantially parallel with the line connecting the shotpoints. Seismic waves are successively recreated at the shotpoints and the waves of each shotpoint are in turn simultaneously received at a plurality of receivers substantially parallel with and laterally of the first mentioned line of receivers whereby the location is determined on one of the lines of receivers at which waves from the wave sources reflected from the subsurface layer are received in an equal time interval. Also, the location is determined on the other line of receivers at which waves from the wave sources reflected from the same layer are received in an equal time interval. When operating according to the procedure illustrated in Fig. 3 the dip of a given subsurface stratum is determined by successively creating seismic waves at a plurality of spaced shotpoints. The waves from each shotpoint are in turn simultaneously received at a plurality of receivers disposed on a straight line between the shotpoints. Seismic waves are recreated at the shotpoints, which waves are in turn simultaneously received from each shotpoint at a plurality of receivers disposed on another straight line between the shotpoints intersecting the first line.

Various changes may be made within the scope of the appended claims in which it is desired to claim all novelty inherent in the invention as broadly as the prior art permits.

I claim:

1. In seismic prospecting, the steps which comprise creating seismic waves successively at two selected points spaced from each other, and receiving the waves from each shot point at a plurality of receivers disposed in substantial alignment on a line spaced from and substantially parallel to a line connecting the shot points.

2. In the method of determining the dip of a given subsurface stratum, the steps which comprise successively creating seismic waves at a plurality of spaced shot points, and in turn receiving the waves from each shot point at a plurality of receivers disposed on straight lines between the shot points.

3. In the method of determining the dip of a given subsurface stratum, the steps which comprise successively creating seismic waves at a plurality of spaced shot points, in turn receiving the waves from each shot point at a plurality of receivers disposed on a straight line between the shot points, recreating seismic waves at the shot points, and in turn receiving the waves from each shot point at a plurality of receivers disposed on another straight line between the shot points.

4. In the method of determining the dip of a given subsurface stratum, the steps which comprises successively creating seismic waves at a plurality of spaced shot points, in turn receiving the waves from each shot point at a plurality of receivers disposed on a straight line between the shot points, recreating seismic waves at the shot points, and in turn receiving the waves from each shot point at a plurality of receivers disposed on another straight line between the shot points intersecting the first line.

5. In the method of determining the dip of a given subsurface stratum, the steps which comprise successively creating seismic waves at a plurality of spaced shot points, and in turn receiving the waves from each shot point at a plurality of receivers disposed on straight lines connecting the shot points.

6. In the method of determining the dip of a given subsurface stratum, the steps which comprise successively creating seismic waves at a plurality of spaced shot points, in turn receiving the waves from each shot point at a plurality of receivers disposed on straight lines connecting two opposite shot points, recreating seismic waves at the shot points, and in turn receiving the waves from each shot point at a plurality of receivers disposed on a straight line connecting other opposite shot points.

7. In the method of determining the dip of a given subsurface stratum, the steps which comprise successively creating waves at a plurality of shot points disposed on straight lines, which intersect each other between the shot points, in turn receiving the waves from each shot point at a plurality of receivers disposed on one of the lines including one receiver disposed at the intersection, successively recreating seismic waves at the shot points, and in turn receiving the waves of each shot point at a plurality of receivers disposed on the other line and at the intersection.

8. In the method of determining the dip of a given subsurface stratum, the steps which comprise successively creating waves at a plurality of shot points disposed on lines which intersect each other between the shot points substantially at right angles, in turn receiving the waves from one shot point at a plurality of receivers disposed on one of the lines including one receiver disposed at the intersection, successively recreating seismic waves at the shot points, and in turn receiving the waves of each shot point at a plurality of receivers disposed on the other line and at the intersection.

9. In the method of determining the dip of a given subsurface stratum, the steps which comprise successively creating seismic waves at a plurality of shot points disposed on lines which intersect each other between the shot points, in turn receiving the waves from each shot point at a plurality of receivers disposed on one of the lines including one receiver disposed at the intersection, a majority of the receivers being disposed on one side of the intersection, successively recreating seismic waves at the shot points, and in turn receiving the waves from each shot point at a plurality of receivers disposed on the other line and at the intersection, a majority of the receivers being disposed on one side of the intersection.

10. In the method of determining the dip of a given subsurface stratum, the steps which comprise locating detectors along a substantially straight line, establishing a plurality of shot points such that lines connecting opposite pairs of shot points are approximately parallel and approximately perpendicular respectively to the line along which the detectors are located, simultaneously recording waves at the detector locations for each of the beforementioned shot points successively, moving the detectors to new locations along a line approximately parallel and approximately perpendicular respectively to the lines connecting opposite pairs of shot points, and simultaneously recording seismic waves at these detector locations from each shot point successively.

11. In the method of determining the dip of a given subsurface stratum, the steps which comprise locating detectors along a substantially straight line, establishing a plurality of shot points on opposite sides of the detectors such that lines connecting one of the opposite pairs of shot points is approximately perpendicular to the line along which the detectors are located, simultaneously recording waves at the detector locations from each of the before mentioned shot points successively, moving the detectors to new locations along a line substantially perpendicular to the line where they were first located, and simultaneously recording seismic waves at these detector locations from each shotpoint successively.

12. In the method of determining the dip of a given subsurface stratum, the steps which comprise successively creating seismic waves at a plurality of aligned shot points, in turn receiving the seismic waves of each shot point at a plurality of receivers disposed on a line substantially parallel with the line connecting the shot points, and in turn receiving the waves of each shot point at a plurality of receivers substantially parallel with and laterally of the first mentioned line of receivers.

13. The method of determining the dip of a given subsurface stratum, which comprises successively creating seismic waves at a plurality of aligned shot points, in turn receiving the seismic waves of each shot point at a plurality of receivers disposed on a line substantially parallel with the line connecting the shot points, successively recreating seismic waves at the shot points, and in turn receiving the waves of each shot point at a plurality of receivers substantially parallel with and laterally of the first mentioned line of receivers whereby the location is determined on one of the lines of receivers at which waves from the wave sources reflected from the subsurface layer are received in an equal time interval and the location is determined on the other line of receivers at which waves from the wave sources reflected from the same layer are received in an equal time interval.

14. In the method of determining the dip of a given subsurface stratum, the steps which comprise successively creating seismic waves at a plurality of aligned shot points, in turn receiving seismic waves from each point at a plurality of receivers disposed on a line substantially parallel with and on one side of the line connecting the shot points, successively recreating seismic waves at the shot points, and in turn receiving waves of each shot point at a plurality of receivers substantially parallel with and on the opposite side of the line connecting the shot points.

15. In the method of determining the dip of a given subsurface stratum, the steps which comprise successively creating seismic waves at a plurality of spaced shot points, in turn receiving the waves from each shot point at a plurality of receivers disposed on straight lines on opposite sides of a straight line connecting the shot points.

16. In the method of determinng the dip of a given subsurface stratum, the steps which comprise successively creating seismic waves at a plurality of spaced shot points, and in turn receiving the waves from each shot point at a plurality of receivers disposed on lines between the shot points.

17. In the method of determining the dip of a given subsurface stratum, the steps which comprise successively creating seismic waves at a plurality of spaced shot points, in turn receiving the waves from each shot point at a plurality of receivers disposed on a line between the shot points, recreating seismic waves at the shot points, and in turn receiving the waves from each shot point at a plurality of receivers disposed on another line between the shot points.

18. In the method of determining the dip of a given subsurface stratum, the steps which comprise successively creating seismic waves at a plurality of spaced shot points, in turn receiving the waves from each shot point at a plurality of receivers disposed on a line between the shot points, recreating seismic waves at the shot points, and in turn receiving the waves from each shot point at a plurality of receivers disposed on another line between the shot points intersecting the first line.

19. In the method of determining the dip of a given subsurface stratum, the steps which comprise successively creating seismic waves at a plurality of spaced shot points, and in turn receiving the waves from each shot point at a plurality of receivers disposed on lines connecting the shot points.

20. In the method of determining the dip of a given subsurface stratum, the steps which comprise successively creating seismic waves at a plurality of spaced shot points, in turn receiving the waves from each shot point at a plurality of receivers disposed on lines connecting two opposite shot points, recreating seismic waves at the shot points, and in turn receiving the waves from each shot at a plurality of receivers disposed on a line connecting other opposite shot points.

21. In the method of determining the dip of a given subsurface stratum, the steps which comprise successively creating waves at a plurality of shot points disposed on lines which intersect each other between the shot points, in turn receiving the waves from each shot point at a plurality of receivers disposed on one of the lines including one receiver disposed at the intersection, successively recreating seismic waves at the shot points, and in turn receiving the waves of each shot point at a plurality of receivers disposed on the other line and at the intersection.

22. In the method of determining the dip of a given subsurface stratum, the steps which comprise locating detectors along a line, establishing a plurality of shot points such that lines connecting opposite pairs of shot points are approximately parallel and approximately perpendicular respectively to the line along which the detectors are located, simultaneously recording waves at the detector locations for each of the before mentioned shot points successively, moving the detectors to new locations along a line approximately parallel and approximately perpendicular respectively to the lines connecting opposite pairs of shot points, and simultaneously recording seismic waves at these detector locations from each shot point successively.

23. In the method of determining the dip of a given subsurface stratum, the steps which comprise locating detectors along a line, establishing a plurality of shot points on opposite sides of the detectors such that lines connecting one of the opposite pairs of shot points is approximately perpendicular to the line along which the detectors are located, simultaneously recording waves at the detector locations from each of the before mentioned shot points successively, moving the detectors to new locations along a line substantially perpendicular to the line where they were first located, and simultaneously recording seismic waves at these detector locations from each shot point successively.

LUDWIG W. BLAU.